United States Patent
Stahl et al.

(10) Patent No.: US 7,106,457 B1
(45) Date of Patent: Sep. 12, 2006

(54) ACHROMATIC SHEARING PHASE SENSOR FOR GENERATING IMAGES INDICATIVE OF MEASURE(S) OF ALIGNMENT BETWEEN SEGMENTS OF A SEGMENTED TELESCOPE'S MIRRORS

(75) Inventors: H. Philip Stahl, Brownsboro, AL (US); Chanda Bartlett Walker, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 245 days.

(21) Appl. No.: 10/857,372

(22) Filed: May 21, 2004

Related U.S. Application Data

(60) Provisional application No. 60/474,753, filed on May 29, 2003.

(51) Int. Cl.
*G01B 9/02* (2006.01)
(52) U.S. Cl. ...................................... 356/521
(58) Field of Classification Search ................ 356/508, 356/520, 521
See application file for complete search history.

(56) References Cited

U.S. PATENT DOCUMENTS

| | | |
|---|---|---|
| 3,729,260 A | 4/1973 | Walsh |
| 3,829,219 A | 8/1974 | Wyant |
| 4,504,147 A | 3/1985 | Huang |
| 4,518,854 A | 5/1985 | Hutchin |
| 4,620,790 A | 11/1986 | Hufnagel |
| 4,692,027 A | 9/1987 | MacGovern et al. |
| 4,696,573 A | 9/1987 | Hutchin |
| 4,705,400 A | 11/1987 | Ellerbroek et al. |
| 4,946,280 A | 8/1990 | Horton |
| 5,080,490 A * | 1/1992 | Manhart ..................... 356/492 |
| 5,108,168 A | 4/1992 | Norbert et al. |
| 5,113,064 A | 5/1992 | Manhart |
| 5,113,284 A | 5/1992 | Stuhlinger |
| 5,249,080 A | 9/1993 | Watson et al. |
| 5,265,034 A | 11/1993 | Breckenridge et al. |
| 5,291,333 A | 3/1994 | Mills et al. |
| 5,477,602 A | 12/1995 | Bosma |
| 5,606,417 A | 2/1997 | Primot et al. |
| 5,675,413 A | 10/1997 | Prikryl et al. |
| 5,898,529 A | 4/1999 | Meyer et al. |
| 6,081,333 A | 6/2000 | Perchak |
| 6,163,381 A | 12/2000 | Davies et al. |
| 6,421,164 B1 | 7/2002 | Tearney et al. |
| 6,909,512 B1 * | 6/2005 | Vasudevan et al. ......... 356/521 |
| 2003/0043384 A1 | 3/2003 | Hill |
| 2003/0053079 A1 | 3/2003 | Hill |

* cited by examiner

*Primary Examiner*—Gregory J. Toatley, Jr.
*Assistant Examiner*—Marissa J Detschel
(74) *Attorney, Agent, or Firm*—James J. McGroary; Peter J. Van Bergen

(57) ABSTRACT

An achromatic shearing phase sensor generates an image indicative of at least one measure of alignment between two segments of a segmented telescope's mirrors. An optical grating receives at least a portion of irradiance originating at the segmented telescope in the form of a collimated beam and the collimated beam into a plurality of diffraction orders. Focusing optics separate and focus the diffraction orders. Filtering optics then filter the diffraction orders to generate a resultant set of diffraction orders that are modified. Imaging optics combine portions of the resultant set of diffraction orders to generate an interference pattern that is ultimately imaged by an imager.

22 Claims, 3 Drawing Sheets

ACHROMATIC SHEARING PHASE SENSOR FOR GENERATING IMAGES INDICATIVE OF MEASURE(S) OF ALIGNMENT BETWEEN SEGMENTS OF A SEGMENTED TELESCOPE'S MIRRORS

This application claims the benefit of provisional application 60/474,753 filed May 29, 2003.

ORIGIN OF THE INVENTION

The invention was made in performance of work under a NASA contract and by an employee of the United States Government and is subject to the provisions of Public Law 96-517 (35 U.S.C. §202) and may be manufactured and used by or for the Government of the United States of America for governmental purposes without the payment of any royalties thereon or therefor. In accordance with 35 U.S.C. §202, the Contractor has elected not to retain title. Pursuant to 35 U.S.C. §119, the benefit of priority from provisional application 60/474,753, with a filing date of May 29, 2003, is claimed for this non-provisional application.

BACKGROUND OF THE INVENTION

1. Field of the Invention

This invention relates to sensors used to align mirror segments of a segmented telescope. More specifically, the invention is an achromatic shearing phase sensor that can be used in the detection of out-of-plane alignment errors between segments of a segmented telescope's mirrors.

2. Description of the Related Art

In order to reduce some of the mechanical and financial burdens associated with a large aperture telescope, multiple mirror or segmented telescopes have found a place in the family of space-based and Earth-based optics. The difficulty in using a segmented telescope is that the mirror segments must be aligned such that they perform as a contiguous surface. When this is accomplished, two benefits are obtained. First, the energy from each segment coherently sums at the segments' focus. Second, the higher spatial frequency information from the source is preserved, i.e., spatial frequency $\xi \propto 1/x$ where x is the largest spatial dimension of the telescope's aperture. The result is a much brighter and much smaller image of each point of the source.

To behave as a contiguous surface, each mirror segment must produce an image at the same place in all three spatial dimensions. Alignment in the x and y dimensions perpendicular to the direction of propagation, is relatively straightforward. This task can be achieved by direct measurement of the irradiance from a particular segment. The third dimension (i.e., z-axis) is more difficult to align because it involves measurement of the phase of a wavefront. To achieve this measurement, the phase is typically inferred from irradiance patterns.

The alignment of a mirror segment's wavefronts (or phase alignment) must be accurate to a small fraction of the operation wavelength of light for coherent imagery to occur. Measurement of the wavefront's phase must be even more precise to achieve sufficient alignment for a given application.

Phase alignment of most segmented telescopes can be achieved in stages. The first stage or course alignment phases the mirror segments to within a few wavelengths using a large capture range sensor that can be somewhat inaccurate. The next stage finely aligns the system to a fraction of the operating wavelength using a sensor with a comparatively small capture range but very good accuracy. Finally, alignment can be maintained by a third sensor that is fast and efficient. Combinations of wavefront sensing techniques, such as a Shack-Hartmann and a wavefront curvature sensor, have been investigated for some extra large telescope (ELT) designs. Since phasing may be achieved in many stages by many sensors, the attributes of a useful sensor varies. The application of the sensor to a telescope that is space-based looking out, spaced-based looking in, or Earth-based, can change the sensor's requirements dramatically.

Currently, there are five categories of phasing techniques used to address the segmented telescope phasing problem. The first technique is a mechanical approach commonly represented by inductive or capacitive sensors (i.e., edge sensors as they are known) located on the structure of the segments. The second technique is the accurate but sometimes mathematically complex phase retrieval techniques. Related to the phase retrieval techniques are the third and fourth techniques known as curvature sensing techniques and image metric techniques, respectively. The fifth technique utilizes adjacent segment interferometry.

Mechanical edge sensors are typically inductive coil or capacitive sensors located on the structure of a segment for measuring the position of one segment relative to an adjacent segment. However, the physical size of the edge sensors and spacing therebetween limits the capture range thereof. Further, edge sensors and their measurements can be affected by physical changes to the mirror segment's edges induced by environmental conditions. Thus, edge sensors are not well suited to long-term use where the physical properties of a segmented telescope may change.

Phase retrieval techniques are based on what is known as the phase diversity concept. The phase diversity method utilizes two or more simultaneous, monochromatic images (i.e., one in-focus and one out-of-focus) to calculate the wavefront at the telescope's pupil plane. The in-focus image is mathematically described as the convolution of the point spread function with the object. The out-of-focus image is similar except there is a known defocus term in the second point spread function. Since the defocus term is well quantified, the point spread function of the optical system and the object irradiance distribution can be mathematically estimated. In general, phase diversity techniques are quite complex and time consuming making them impractical for use with dynamic telescopes or telescopes that drift at a faster rate than the time it takes for the phase diversity calculation to be completed. (More recently, modified phase diversity techniques, i.e., phase-diverse phase retrieval and phase diversity wavefront sensing, have been proposed. These updated techniques somewhat simplify the mathematics involved by removing one or more Fourier transforms required.) Phase retrieval techniques are also somewhat limited in that they generally must be used with point sources, although an extended source could be used if sufficient spatial information is provided. However, use with a broadband source requires a substantial amount of sensing and processing sophistication.

Similar to phase retrieval techniques are curvature sensing techniques that also compare two images, one before focus and one after focus, to compute the curvature of the wavefront. Variations on this concept have been applied to segmented telescopes by a number of research groups. For example, phase discontinuity sensing is a curvature sensing technique that compares two images of a point source formed by a segmented mirror. The images are far enough away from the focal plane that each of the mirrors are distinguishable from the others. The after-focus image is rotated 180° to compensate for the inversion upon going through an image plane. The two images are then subtracted pixel-by-pixel. The difference image is compared to a library of template difference images. The comparison correlation coefficient varies linearly with (mirror segment) piston error. When a segment is aligned appropriately, the images before and after focus are identical and the difference irradiance distribution is zero. When this occurs, the correlation coefficient between the measured image and the template image will also be zero. As the mirror becomes misaligned, the images change relative to each other and the difference irradiance increases as does the correlation coefficient. The correlation coefficient continues to increase until the piston exceeds $\lambda/8$ where it begins to decline. While the curvature sensing technique utilizes a fast algorithm for analyzing the piston errors of a segmented telescope, it is an iterative process and has a limited capture range.

Image metric techniques are based upon calculating a single number (or a few numbers) from the image of a segmented telescope. The number or metric is recalculated after an adjustment has been made to the telescope. If the new calculation is improved compared to the original, the adjustment to the telescope is maintained as the new configuration. There are many different metrics to indicate improved alignment such as maximum irradiance, Strehl ratio, and total encircled energy. However, image metric techniques can only optimize alignment with regard to the particular metric being employed which, typically, is only indicative of one aspect of alignment. Thus, image metric techniques may not provide the necessary information for overall mirror segment alignment.

Adjacent segment interferometry techniques compare the piston positions of two adjacent mirror segments using interferometry methods. The relative piston positions from each pair is reported by a sensing system to an algorithm that calculates the optimum mirror alignment. The sensing system can be a phasing camera system (PCS) that analyzes the interference pattern generated by a mask having small circular (or square) apertures located at each of the telescope's inter-segment edges when the mask is placed over the telescope's image. The size of each aperture is chosen to be smaller than the Fried parameter, which is the atmospheric turbulence coherence length.

For computational simplicity, the interference pattern transmitted through the apertures is compared to a simulated set of templates. The templates are irradiance patterns that would be observed if the phase difference between the two segments (each filling one half of the circular sub-aperture) were translated from in-phase to out-of-phase, then back in-phase in small steps.

The technique is first performed using broadband sources and then performed using narrowband sources for increased accuracy. That is, the measured data are first collected using a series of broadband sources. Each consecutive source has a broader band (i.e., a shorter coherence length) than the previous source to ultimately find the absolute phase position of the segments. For each source, multiple measurements are collected as one segment scans through a distance corresponding to the coherence length of the source. When a particular measured interference pattern correlates well with a template, this indicates that the segments are positioned within the coherence length of the source. The scanned mirror is then returned to the appropriate position where interference occurred. This process is applied with successively broader sources to "walk" the mirror segments into alignment.

After achieving segment alignment to within one wavelength phase difference using broadband sources, a similar process is performed using narrowband sources. Specifically, a monochromatic source is used to generate the interference pattern data set. This data set is also compared with the original templates to find the absolute phase alignment position for each mirror as opposed to the degree of interference. After the two images with the highest correlation coefficient are determined, a quadratic interpolation is used to achieve finer resolution of piston measurement. However, the algorithm used for narrowband phasing is limited in its accuracy.

Another adaptive segment interferometry technique uses a dispersed fringe sensor (DFS). Like the PCS method, DFS uses a mask having an array of apertures aligned with the inter-segment edges of the telescope to compare the irradiance from adjacent segments. The apertures are rectangular with the longer dimension being parallel to the gap between mirror segments. In DFS, the transmitted irradiance from two adjacent mirrors interfere. A dispersing optic such as a prism or diffraction grating separates the interference pattern generated by a white light source into a series of monochromatic fringe patterns perpendicular to the aperture orientation. Along the vertical axis of the interference pattern, the wavelength is constant, while along the horizontal axis, the wavelength varies. Each vertical cross-section of the pattern indicates the piston difference of the two mirrors as measured by the corresponding wavelength. The period of the fringe pattern along the wavelength axis, measured as a function of space, is used to calculate the piston difference between two segments of a telescope. The sign of the error is determined by slightly moving one element and then re-measuring the phase difference. The accuracy of the DFS technique reduces as the piston difference approaches zero and the period of the overall pattern becomes large or infinite.

More importantly, both of the above-described mask-based sensors (i.e., PCS and DFS) are limited to measuring very small edge portions of each mirror segment. As a result, information generated by these sensors is "silent" with respect to any mirror segment deformations which can be critical in segmented telescope alignment.

SUMMARY OF THE INVENTION

Accordingly, it is an object of the present invention to provide a sensor that can be used in the alignment of a segmented telescope's mirrors.

Another object of the present invention is to provide a sensor that uses the interference of images generated by two adjacent segments of a segmented telescope in a simple manner.

Still another object of the present invention is to provide a sensor that provides information useful for aligning a segmented telescope in piston and tip/tilt.

Other objects and advantages of the present invention will become more obvious hereinafter in the specification and drawings.

In accordance with the present invention, an achromatic shearing phase sensor generates an image indicative of at least one measure of alignment between two adjacent segments of a segmented telescope's mirrors. An optical grating is positioned in a first plane that is located at one of (i) approximately a pupil plane of a segmented telescope or (ii) approximately conjugate to the pupil plane of the segmented telescope. The optical grating receives at least a portion of irradiance originating at the segmented telescope in the form of a collimated beam, and split the collimated beam into a plurality of diffraction orders. Focusing optics, positioned to receive the diffraction orders of the collimated beam, separate and focus the diffraction orders on a second plane. Filtering optics, positioned in the second plane, then filter the diffraction orders to generate a resultant set of diffraction orders that are modified. Imaging optics, positioned to receive the resultant set of diffraction orders, combine portions of the resultant set of diffraction orders to generate an interference pattern in a third plane that is approximately conjugate to the first plane. An imager is positioned in the third plane to generate an image of the interference pattern.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
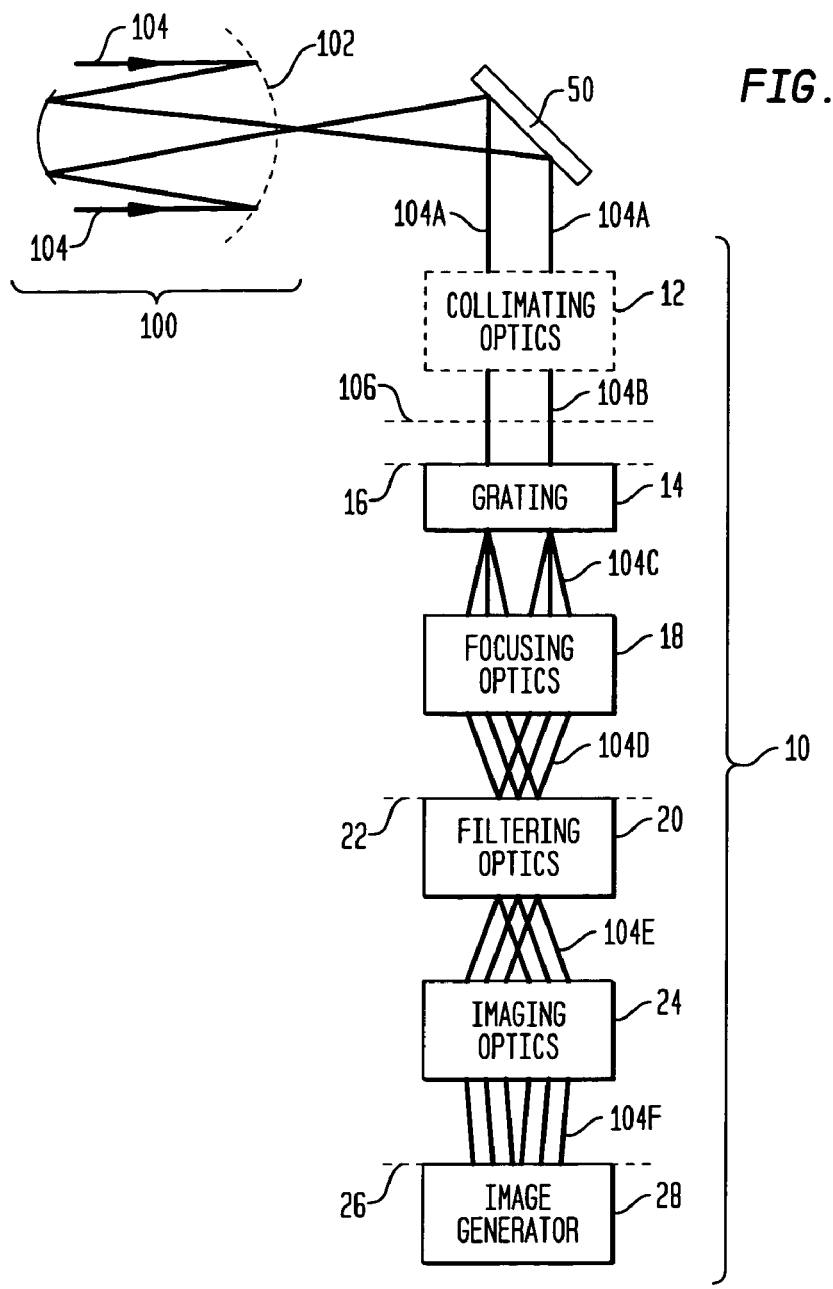
FIG. 1 is a schematic view of an embodiment of an achromatic shearing phase sensor in accordance with the present invention.

Referring now to the drawings, and more particularly to FIG. 1, an embodiment of an achromatic shearing phase sensor according to the present invention is shown and is and referenced generally by numeral 10. Sensor 10 will be described herein for use with a telescope 100 of any known type in the art that has a primary mirror divided into a plurality of mirror segments 102 that receive incoming irradiance 104 from a source (not shown) as is known in the art. Mirror segments 102 focus irradiance 104 at a location where an end user can view the focused image. For purpose of the present invention, a portion of irradiance 104 will be used by sensor 10 to generate an image that is indicative of one or more measures of alignment between two adjacent mirror segments.

Mirror segments 102 require initial alignment and alignment from time-to-time during the life of telescope 100. In general, sensor 10 generates an image associated with large portions of two mirror segments. However, practically speaking, the image will be generated for two adjacent mirror segments with the image then being used to align the adjacent segments in piston and, optionally, in tip/tilt. Accordingly, the remainder of the description will address measurements associated with two adjacent mirror segments. To generate this image, sensor 10 creates a plurality of diffracted beams with a diffraction grating placed at or near the pupil plane of telescope 100 or a plane conjugate to the telescope pupil plane. Certain ones of the diffracted beams (or orders) are re-imaged at a plane (that is conjugate with the plane of the diffraction grating) with a shear displacing the re-imaged orders. The amount of shear is equal to the size of the re-imaged segments.

More specifically, sensor 10 operates on a portion 104A of irradiance 104 originating at telescope 100. For example, portion 104A can be directed to sensor 10 by a beamsplitter 50 as would be well understood in the art. For proper operation of sensor 10, portion 104A should be collimated. Depending on the type of telescope 100 and/or beamsplitter 50, portion 104A may or may not be collimated. Accordingly, sensor 10 can optionally (as indicated by the dashed line box) include collimation optics 12 to generate a collimated beam 104B of irradiance. An optical diffraction grating 14 is positioned in a plane 16 that is either (i) at or near a pupil plane 106 of telescope 100, or (ii) approximately conjugate to pupil plane 106 as reimaged by optional collimating optics or other optical components (not shown) as would be well understood in the art. Optical diffraction grating 14 can be any ruled, sinusoidal, amplitude or phase grating capable of splitting collimated beam 104B into diffraction orders thereof as referenced by numeral 104C. As would be well understood by one of ordinary skill in the art of shearing interferometry, grating 14 is sized/configured to produce shear associated with two adjacent ones of mirror segments 102 when diffraction orders 104C are processed in accordance with the remaining elements of sensor 10. To phase adjacent segments in a different direction, optical grating 14 can be shifted (e.g., rotated) in plane 16 such that it is aligned parallel to the symmetry of the segment population pattern. Accordingly, sensor 10 can include a (motorized) grating shifter 14A coupled to optical grating 14. The beam splitting function of optical grating 14 could also be performed by other types of optical elements (e.g., a hologram, a beamsplitter, etc.) without departing from the scope of the present invention.

For proper processing of diffraction orders 104C, it is necessary to separate and focus same. Accordingly, focusing optics 18 separate/focus diffraction orders 104C to generate separated orders 104D that are incident on filtering optics 20 located in a plane 22. In general, filtering optics 20 modifies separated orders 104D in one or more ways to generate a resultant set of orders 104E with the specific resultant set being dependent on the type(s) of telescope alignment measurements that are desired. The resultant set of orders 104E are passed to imaging optics 24. Several non-limiting examples of filtering optics 20 will be explained herein with the aid of FIGS. 2–7. For ease of illustration, FIGS. 2–7 illustrate light exiting the elements of filtering optics 20 as single or chief rays.

Figure 2:
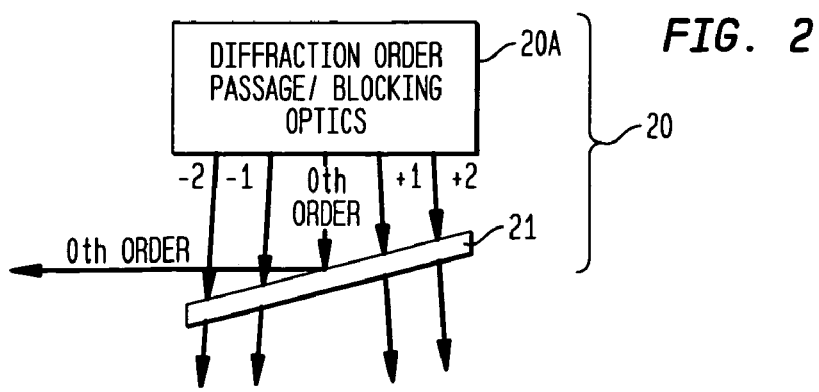
FIG. 2 is a schematic view of one embodiment of the sensor's filtering optics that passes multiple diffraction orders.

In FIG. 2, filtering optics 20 comprises a diffraction order passage/blocking optics 20A that is "transparent" with respect to certain ones of separated orders 104D and "opaque" with respect to all others of separated orders 104D. For example, in FIG. 2, optics 20A is configured to pass the 0-th order, the ±1st orders, and the ±2nd orders, while blocking all other higher orders. Note that optics 20A could be configured to pass additional diffraction order pairs without departing from the scope of the present invention. The 0-th order can optionally be re-directed by an optical component 21. The 0-th order could then be used (e.g., by a quad cell or other position sensitive detector) in aligning telescope 100 in tip/tilt as will be explained later below. Optical component 21 should also be chosen to allow the "+" and "−" diffraction order pairs to be passed to imaging optics 24 as the resultant set of orders 104E.

Figure 3:
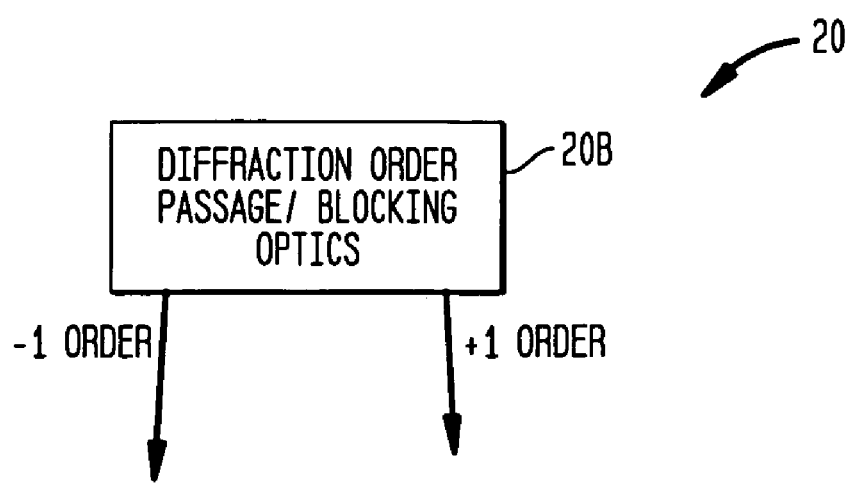
FIG. 3 is a schematic view of another embodiment of the sensor's filtering optics that passes only the +1 and −1 diffraction orders.
Figure 4:
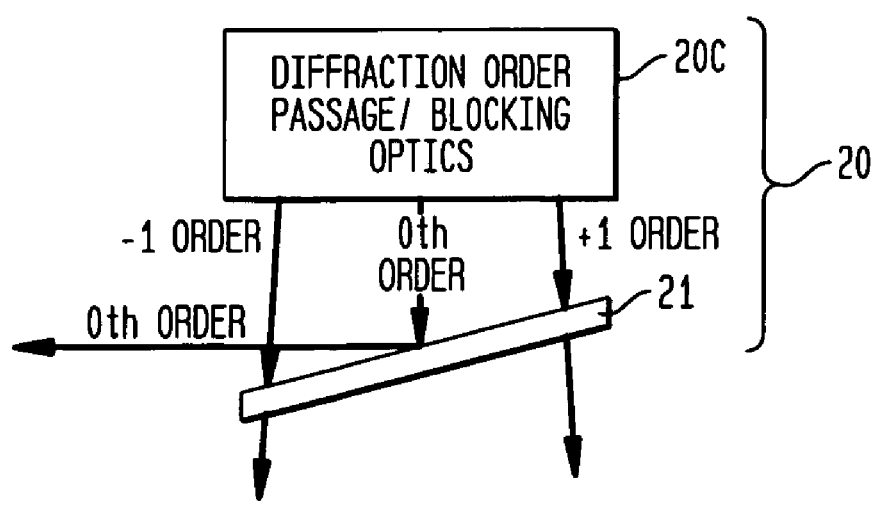
FIG. 4 is a schematic view of another embodiment of the sensor's filtering optics that passes the 0-th, +1 and −1 diffraction orders and re-directs the 0-th order.

In FIG. 3, filtering optics 20 comprises a diffraction order passage/blockage optics 20B that passes only the +1 and −1 diffraction order to imaging optics 24. In FIG. 4, optics 20C passes the 0-th, +1, and −1 diffraction orders, and uses optical component 21 to re-direct the 0-th diffraction order for use in tip/tilt alignment as mentioned above.

Figure 5:
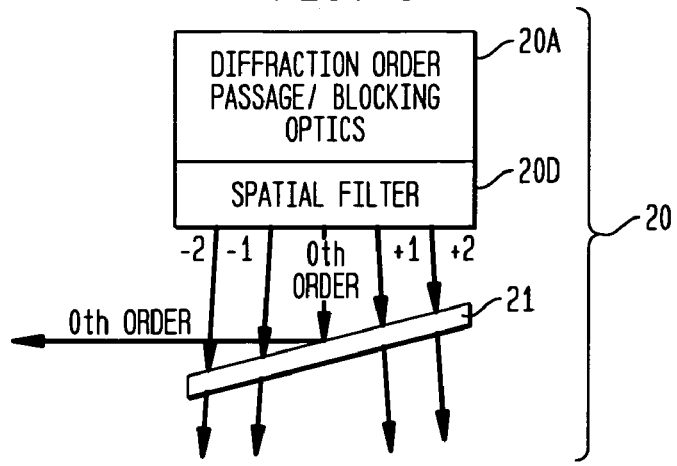
FIG. 5 is a schematic view of another embodiment of the sensor's filtering optics that includes the use of a spatial filter.

Filtering optics 20 can also include additional optics to modify the "passed" orders in some specific way. For example, FIG. 5 illustrates a spatial filtering function (provided by a spatial filter 20D) added to the optical elements shown in FIG. 2 such that the filtering optics now pass and spatial filter selected diffraction order beams. This allows filtering optics 20 to pass only phase information associated with the received diffraction orders, hence improving fringe contrast or visibility in the ultimate imaging portion of sensor 10. Note that each of the embodiments depicted in FIGS. 3 and 4 could similarly include a spatial filter.

Figure 6:
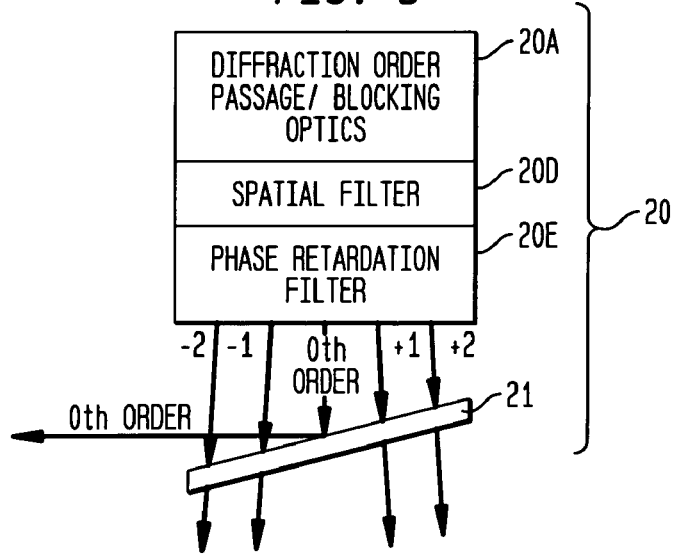
FIG. 6 is a schematic view of another embodiment of the sensor's filtering optics that further includes the use of a phase retardation filter in conjunction with the spatial filter used in FIG. 5.
Figure 7:
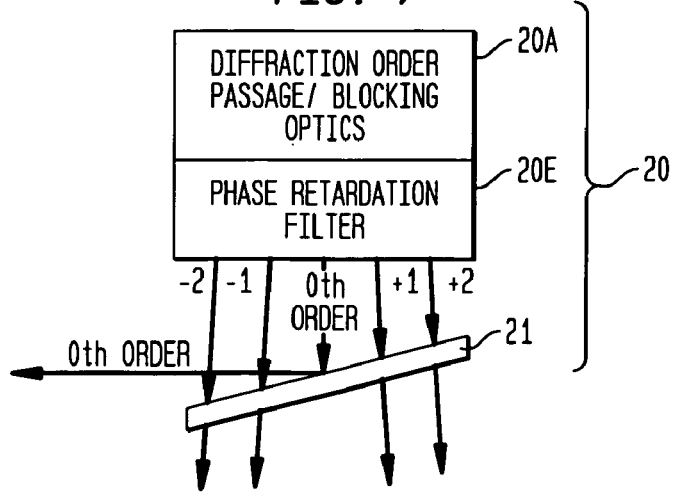
FIG. 7 is a schematic view of another embodiment of the sensor's filtering optics that includes the use of just a phase retardation filter.

The phase of the "+" and "−" diffraction order pairs passed by optics 20A, 20B, 20C and/or spatial filter 20D could also be modified by incorporating a phase retardation function in filtering optics 20. This function can be performed with or without spatial filtering. Accordingly, FIG. 6 illustrates the use of a phase retardation filter 20E in combination with spatial filter 20D, while FIG. 7 illustrates the use of phase retardation filter 20E without spatial filter 20D.

Regardless of the specifics of filtering optics 20, the resultant set of orders 104E are passed to imaging optics 24 for imaging on a plane 26 that is approximately conjugate or conjugate to plane 16. Imaging optics 24 re-images or combines some or all of the "+" and "−" diffraction order pairs supplied thereto at plane 26 to thereby generate an interference pattern as the diffraction order pairs overlap with one another as indicated by 104F. The interference pattern can be imaged by an image generator (e.g., a charge coupled device or CCD array) 28. For simplicity it is preferred that only the +1 and −1 diffraction order pair be used to generate the interference pattern. Accordingly, use of the +1 and −1 diffraction order pair for adjacent mirror segment alignment will be described briefly herein.

If the diffraction grating is aligned correctly (i.e., with its lines parallel to the gap between mirror segments), then the interference pattern created by each mirror segment pair is a set of tilt fringes oriented parallel to the segment pair's gap. The frequency of the fringes is determined by the geometry of the system and grating 14, but not the wavelength of illumination. The position of the fringes is determined by the piston difference of the measured segments. Multiple images of the interference pattern are captured (at image generator 28) using different wavelength sources. The fringes are analyzed to extract a phase map associated with the interference pattern. The phase maps from each different wavelength source are then compared to generate a phase map in the equivalent wavelength.

Since there is a tilt between the two beams, it is possible to place image generator 28 where the two beams overlap with a shear. The required shear is determined by the width of the mirror segments of the telescope. Sensor 10 makes the +1 diffraction order beam wavefront from a mirror segment overlap with the −1 diffraction order beam wavefront from an adjacent mirror segment at image generator 28. The result is an interference pattern comparing two adjacent beams.

As mentioned briefly above, the 0-th diffraction order (that has been separated, focused and re-directed by sensor 10) can be used to align two adjacent mirror segments in tip/tilt. For example, the 0-th diffraction order could be used to align each mirror segment in accordance with a Shack-Hartmann configuration as would be understood by one skilled in the art.

Another approach for using the images generated by sensor 10 in tip/tilt alignment involves comparing the period of two interference patters (generated with different wavelengths) by means of a Fourier transform to yield tilt information. Briefly, two interference patterns (generated at two different wavelengths) of an adjacent pair of mirror segments are captured. The captured images are Fourier transformed to extract the fundamental period (for each wave) of the sinusoidal pattern in the x and y directions of the mirror segments. Tilt is proportional to the difference between the x-axis periods from the two wavelengths.

The advantages of the present invention are numerous. The achromatic shearing phase sensor provides image information from two adjacent mirror segments of a segmented telescope that can, in turn, be used in the alignment of the mirror segments. The sensor can provide information about each mirror segment's surface area as opposed to just the edges of the mirror segment. The sensor can be used with any point, extended or broadband source of irradiance. The design is simple and uses simple optic components.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An achromatic shearing phase sensor for generating an image indicative of at least one measure of alignment between two segments of a segmented telescope's mirrors, said sensor comprising:

an optical grating, positioned in a first plane that is located at one of (i) approximately a pupil plane of a segmented telescope or (ii) approximately conjugate to the pupil plane of the segmented telescope, for receiving at least a portion of irradiance originating at the segmented telescope and incident on said optical grating in the form of a collimated beam, said optical grating splitting said collimated beam into a plurality of diffraction orders thereof;

focusing optics, positioned to receive said plurality of diffraction orders of said collimated beam, for separating and focusing said plurality of diffraction orders of said collimated beam on a second plane;

filtering optics, positioned in said second plane, for filtering said plurality of diffraction orders of said collimated beam to generate a resultant set of diffraction orders that are modified relative to said plurality of diffraction orders;

imaging optics, positioned to receive said resultant set of diffraction orders, for combining portions of said resultant set of diffraction orders to generate an interference pattern in a third plane that is approximately conjugate to said first plane; and imaging means, positioned in said third plane, for generating an image of said interference pattern.

2. An achromatic shearing phase sensor as in claim 1 wherein said filtering optics blocks a 0-th diffraction order of said collimated beam.

3. An achromatic shearing phase sensor as in claim 1 wherein said filtering optics passes a 0-th diffraction order of said collimated beam.

4. An achromatic shearing phase sensor as in claim 3 wherein said filtering optics includes optics for redirecting said 0-th diffraction order, wherein said 0-th diffraction order is removed from said resultant set of diffraction orders incident on said imaging optics.

5. An achromatic shearing phase sensor as in claim 1 further comprising collimating optics for receiving and collimating the irradiance originating at the segmented telescope in order to form said collimated beam prior to incidence thereof on said optical grating.

6. An achromatic shearing phase sensor as in claim 1 wherein said filtering optics is transparent with respect to said resultant set of diffraction orders.

7. An achromatic shearing phase sensor as in claim 1 wherein said filtering optics includes a spatial filter for passing only phase information associated with said portions of said resultant set of diffraction orders to be combined by said imaging optics.

8. An achromatic shearing phase sensor as in claim 7 wherein said filtering optics further includes a phase retardation filter for modifying said phase information.

9. An achromatic shearing phase sensor as in claim 1 wherein said filtering optics includes a phase retardation filter for modifying phase information associated with said portions of said resultant set of diffraction orders to be combined by said imaging optics.

10. An achromatic shearing phase sensor as in claim 1 wherein said imaging means comprises a charge coupled device (CCD) array.

11. An achromatic shearing phase sensor as in claim 1 further comprising means coupled to said optical grating for shifting said optical grating in said first plane.

12. An achromatic shearing phase sensor for generating an image indicative of at least one measure of alignment between two segments of a segmented telescope's mirrors, said sensor comprising:

an optical grating, positioned in a first plane that is located at one of (i) approximately a pupil plane of a segmented telescope or (ii) approximately conjugate to the pupil plane of the segmented telescope, for receiving at least a portion of irradiance originating at the segmented telescope and incident on said optical grating in the form of a collimated beam, said optical grating splitting said collimated beam into a plurality of diffraction orders thereof;

focusing optics, positioned to receive said plurality of diffraction orders of said collimated beam, for separating and focusing said plurality of diffraction orders of said collimated beam on a second plane;

filtering optics, positioned in said second plane, for blocking all of said plurality of diffraction orders of said collimated beam that are (i) greater than a +1 diffraction order of said collimated beam and (ii) less than a −1 diffraction order of said collimated beam;

imaging optics, positioned to receive said +1 diffraction order and said −1 diffraction order, for re-imaging said +1 diffraction order and said −1 diffraction order in a third plane that is approximately conjugate to said first plane, wherein said +1 diffraction order and said −1 diffraction order are combined; and imaging means, positioned in said third plane, for generating an image of said +1 diffraction order so-combined with said −1 diffraction order.

13. An achromatic shearing phase sensor as in claim 12 wherein said filtering optics blocks a 0-th diffraction order of said collimated beam.

14. An achromatic shearing phase sensor as in claim 12 wherein said filtering optics passes a 0-th diffraction order of said collimated beam.

15. An achromatic shearing phase sensor as in claim 14 wherein said filtering optics includes optics for redirecting said 0-th diffraction order, wherein said 0-th diffraction order is not incident on said imaging optics.

16. An achromatic shearing phase sensor as in claim 12 further comprising collimating optics for receiving and collimating the irradiance originating at the segmented telescope in order to form said collimated beam prior to incidence thereof on said optical grating.

17. An achromatic shearing phase sensor as in claim 12 wherein said filtering optics is opaque with respect to all of said plurality of diffraction orders of said collimated beam that are (i) greater than said +1 diffraction order and (ii) less than said −1 diffraction order.

18. An achromatic shearing phase sensor as in claim 12 wherein said filtering optics includes a spatial filter for passing only phase information associated with said +1 diffraction order and said −1 diffraction order.

19. An achromatic shearing phase sensor as in claim 18 wherein said filtering optics further includes a phase retardation filter for modifying said phase information.

20. An achromatic shearing phase sensor as in claim 12 wherein said filtering optics includes a phase retardation filter for modifying phase information associated with said +1 diffraction order and said −1 diffraction order.

21. An achromatic shearing phase sensor as in claim 12 wherein said imaging means comprises a charge coupled device (CCD) array.

22. An achromatic shearing phase sensor as in claim 12 further comprising means coupled to said optical grating for shifting said optical grating in said first plane.

* * * * *